US012167817B2

(12) United States Patent
Kodali et al.

(10) Patent No.: US 12,167,817 B2
(45) Date of Patent: Dec. 17, 2024

(54) SYSTEMS AND METHODS FOR AUTOMATED COOKING

(71) Applicant: Nala Robotics, Inc., Arlington Heights, IL (US)

(72) Inventors: Vijay Kodali, Palatine, IL (US); Ajay Kumar Sunkara, South Barrington, IL (US)

(73) Assignee: Nala Robotics Inc., Arlington Heights, IL (US)

( * ) Notice: Subject to any disclaimer, the term of this patent is extended or adjusted under 35 U.S.C. 154(b) by 447 days.

(21) Appl. No.: 17/136,609

(22) Filed: Dec. 29, 2020

(65) Prior Publication Data

US 2021/0196081 A1 Jul. 1, 2021

Related U.S. Application Data

(60) Provisional application No. 62/955,939, filed on Dec. 31, 2019.

(51) Int. Cl.
*B25J 9/16* (2006.01)
*A47J 44/00* (2006.01)
(Continued)

(52) U.S. Cl.
CPC ............ *A47J 44/00* (2013.01); *B25J 9/1661* (2013.01); *B25J 11/0045* (2013.01);
(Continued)

(58) Field of Classification Search
CPC .... B25J 11/0045; B25J 11/008; B25J 13/089; B25J 9/1697; B25J 9/1661; A47J 44/00
See application file for complete search history.

(56) References Cited

U.S. PATENT DOCUMENTS 7,174,830 B1 2/2007 Dong
7,183,518 B2 2/2007 Near et al.
(Continued)

FOREIGN PATENT DOCUMENTS

WO WO201997545 5/2019

OTHER PUBLICATIONS

International Search Report filed in PCT/US2020/067313 dated Mar. 22, 2021.

*Primary Examiner* — Khoi H Tran
*Assistant Examiner* — Tanner L Cullen (57) ABSTRACT

Systems and methods for automated cooking are described. In one embodiment, an automated kitchen system includes a robotic device and a computing device having a memory storing instructions and a processor. The instructions cause the processor to identify a recipe associated with an order for at least one food item. The instructions cause the processor to identify an ingredient based on the set of instructions of the recipe. The instructions cause the processor to determine a measurement associated with the ingredient based on the set of instructions of the recipe. The instructions cause the processor to cause the robotic device to retrieve a measured portion of the ingredient based on the measurement and deliver the measured portion of the ingredient to cookware. The instructions cause the processor to cause the robotic device to execute a task in response to the measured portion of the ingredient being delivered to the cookware.

5 Claims, 9 Drawing Sheets

(51) Int. Cl.
  *B25J 11/00*       (2006.01)
  *B25J 13/08*       (2006.01)
  *B25J 19/02*       (2006.01)

(52) U.S. Cl.
  CPC ........... *B25J 11/008* (2013.01); *B25J 13/085* (2013.01); *B25J 19/021* (2013.01)

(56) References Cited

U.S. PATENT DOCUMENTS

| | | |
|---|---|---|
| 8,820,219 B2 | 9/2014 | Buehler |
| 9,131,807 B2 | 9/2015 | Roy et al. |
| 9,643,324 B1 | 5/2017 | Roy et al. |
| 10,064,521 B1 | 9/2018 | Gawali et al. |
| 10,154,756 B2 | 12/2018 | Hall et al. |
| 10,205,605 B2 | 2/2019 | Han |
| 10,213,054 B2 | 2/2019 | Elaty |
| 10,264,916 B2 | 4/2019 | Shivaiah |
| 10,271,686 B2 | 4/2019 | Roy |
| 10,293,488 B2 | 5/2019 | Hall et al. |
| 10,327,583 B2 | 6/2019 | Hiatt et al. |
| 10,455,987 B1 | 10/2019 | He |
| 10,518,409 B2 | 12/2019 | Oleynik |
| 2004/0173103 A1 | 9/2004 | Won |
| 2010/0303972 A1 | 12/2010 | Srivastava |
| 2012/0024170 A1* | 2/2012 | Fritz-Jung ................ B25J 11/00 99/450.1 |
| 2015/0114236 A1 | 4/2015 | Roy |
| 2016/0067866 A1 | 3/2016 | Sekar et al. |
| 2016/0286837 A1 | 10/2016 | Yu et al. |
| 2016/0338545 A1 | 11/2016 | Shah et al. |
| 2017/0221296 A1* | 8/2017 | Jain ..................... G07F 17/0064 |
| 2017/0290345 A1 | 10/2017 | Garden |
| 2018/0127192 A1 | 5/2018 | Cohen |
| 2019/0069722 A1 | 3/2019 | He |
| 2019/0069728 A1* | 3/2019 | Alfarra .................. A23N 12/02 |
| 2019/0125126 A1 | 5/2019 | Cohen |
| 2019/0231147 A1 | 8/2019 | Chen et al. |
| 2019/0381654 A1 | 12/2019 | Oleynik |
| 2020/0139554 A1* | 5/2020 | Sinnet .................... B25J 9/1612 |
| 2020/0154948 A1* | 5/2020 | Grass ...................... A47J 43/04 |
| 2020/0269434 A1* | 8/2020 | Anderson ............... A47J 44/00 |
| 2020/0306980 A1* | 10/2020 | Choi ...................... B25J 9/1697 |
| 2021/0022559 A1* | 1/2021 | Zito ........................ A47J 44/00 |
| 2021/0053231 A1* | 2/2021 | Lee ........................ A47J 36/321 |
| 2021/0394371 A1* | 12/2021 | Ishizu .................. A47J 43/0711 |

\* cited by examiner

SYSTEMS AND METHODS FOR AUTOMATED COOKING

CROSS-REFERENCE TO RELATED APPLICATION

This application claims priority to U.S. Provisional Application Ser. No. 62/955,939 filed on Dec. 31, 2019, which is expressly incorporated herein by reference.

BACKGROUND

The Organization for Economic Cooperation and Development found that on average the residents of Western countries spend an average of two hours and eight minutes a day on meal preparation and cleanup. Meal preparation typically includes following a recipe to determine the amounts of ingredients that should be used and how those ingredients should be incorporated during the cooking process. While following the recipe may be repetitive for a person, even slight deviations from the recipe can ruin a meal. Accordingly, people are daily spending a great deal of time on mundane meal preparation that if not performed correctly can lead to detrimental deviations in taste, consistency, and flavor.

BRIEF DESCRIPTION

According to one aspect, an automated kitchen system having a robotic device and a computing device having a memory storing instructions and a processor is provided. The instructions cause the processor to identify a recipe associated with an order for at least one food item. The instructions cause the processor to identify an ingredient based on the set of instructions of the recipe. The instructions cause the processor to determine a measurement associated with the ingredient based on the set of instructions of the recipe. The instructions cause the processor to cause the robotic device to retrieve a measured portion of the ingredient based on the measurement and deliver the measured portion of the ingredient to cookware. The instructions cause the processor to cause the robotic device to execute a task in response to the measured portion of the ingredient being delivered to the cookware.

According to another aspect, a computer implemented method for preparing food items in a robot kitchen is provided. The computer-implemented method includes identifying a recipe associated with an order for at least one food item. The recipe includes a set of instructions for preparing the at least one food item. The computer-implemented method further includes identifying an ingredient based on the set of instructions of the recipe. The computer-implemented method also includes determining a measurement associated with the ingredient based on the set of instructions of the recipe. The computer-implemented method includes causing the robotic device to retrieve a measured portion of the ingredient based on the measurement and deliver the measured portion of the ingredient to cookware in the kitchen environment. The computer-implemented method yet further includes causing the robotic device to execute a task in response to the measured portion of the ingredient being delivered to the cookware.

According to still another aspect, a non-transitory computer readable storage medium storing instructions that when executed by a computer, which includes a processor perform a method. The method includes identifying a recipe associated with an order for at least one food item. The recipe includes a set of instructions for preparing the at least one food item. The method further includes identifying an ingredient based on the set of instructions of the recipe. The method also includes determining a measurement associated with the ingredient based on the set of instructions of the recipe. The method includes causing the robotic device to retrieve a measured portion of the ingredient based on the measurement and deliver the measured portion of the ingredient to cookware in the kitchen environment. The method yet further includes causing the robotic device to execute a task in response to the measured portion of the ingredient being delivered to the cookware.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings.

DETAILED DESCRIPTION

Systems and methods for automated cooking are described herein. Often a diner may have to travel to a particular restaurant for a specific dish only to be disappointed in the changes that a given chef may make that day, which changes the consistency, quality, flavor, or texture of the dish. Alternatively, the diner can make the dish themselves, but have to sacrifice the consistency of the dish due to lack of ingredients, cookware, or time.

The present systems and methods provide for automated cooking that saves the diner the time that he would otherwise spend on meal preparation. Furthermore, the automated cooking process results in consistency in maintaining the taste, texture, flavor, and visual appeal of the food. In particular, the systems and methods allow a user to order a meal from an automated kitchen system includes a robotic device and a computing device having a processor. The automated kitchen system can cook an order from a diner by storing the necessary ingredients for that cuisine and utilizing the ingredients to cook a recipe without human intervention in the cooking process.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found on portable devices to display information. The display can receive input (e.g., touch input, keyboard input, input from various other input devices, etc.) from a user.

"Input/output device" (I/O device) as used herein can include devices for receiving input and/or devices for outputting data. The input and/or output can be for controlling different features which include various components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, an optical interface, a data interface, and/or an electrical interface.

"Portable device," as used herein, is a computing device typically capable of computer communication. The portable device may have a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely. In other embodiments, the portable device may be a device for facilitating remote communication. For example, the portable device may be a key fob that remotely controls the security system including the door locks, alarms, etc.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry, such as a programmable logic controller, to execute actions and/or algorithms.

"Robotic system," as used herein can include, but is not limited to, any automatic or manual systems that can be used to enhance the cooking process. Exemplary robotic systems include, but are not limited to: an electronic mobility and stability control systems, visual devices (e.g., camera systems, proximity sensor systems), a temperature control system, a lighting system, an audio system, and a sensory system, among others.

"User," as used herein can include, but is not limited to, one or more biological beings. The user can be the user of a portable device or wearable device. The user can be a human (e.g., an adult, a child, an infant) or an animal (e.g., a pet, a dog, a cat).

I. System Over View

Figure 1:
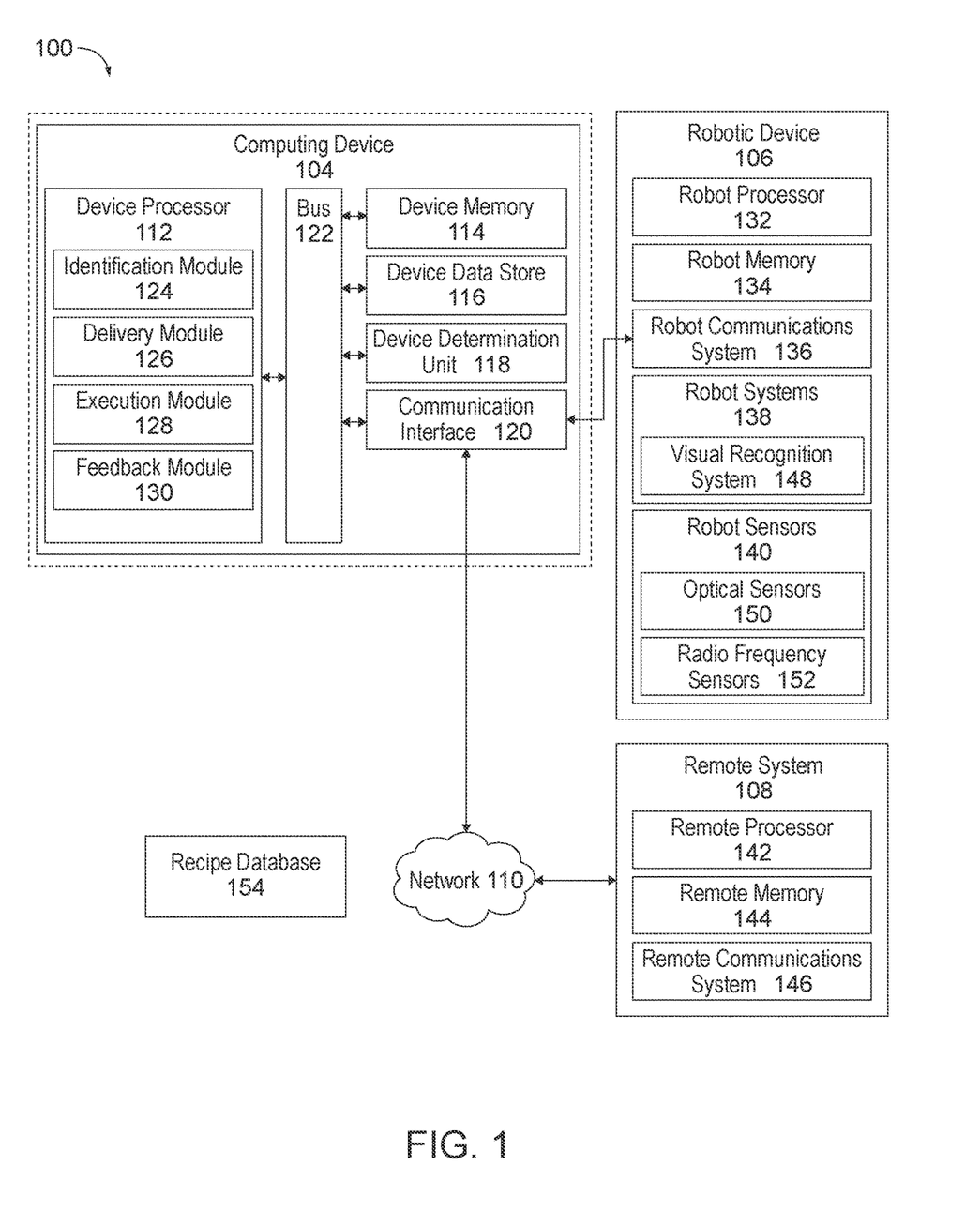
FIG. 1 is a block diagram of an operating environment for systems and methods for automated cooking according to an exemplary embodiment.
Figure 2A:
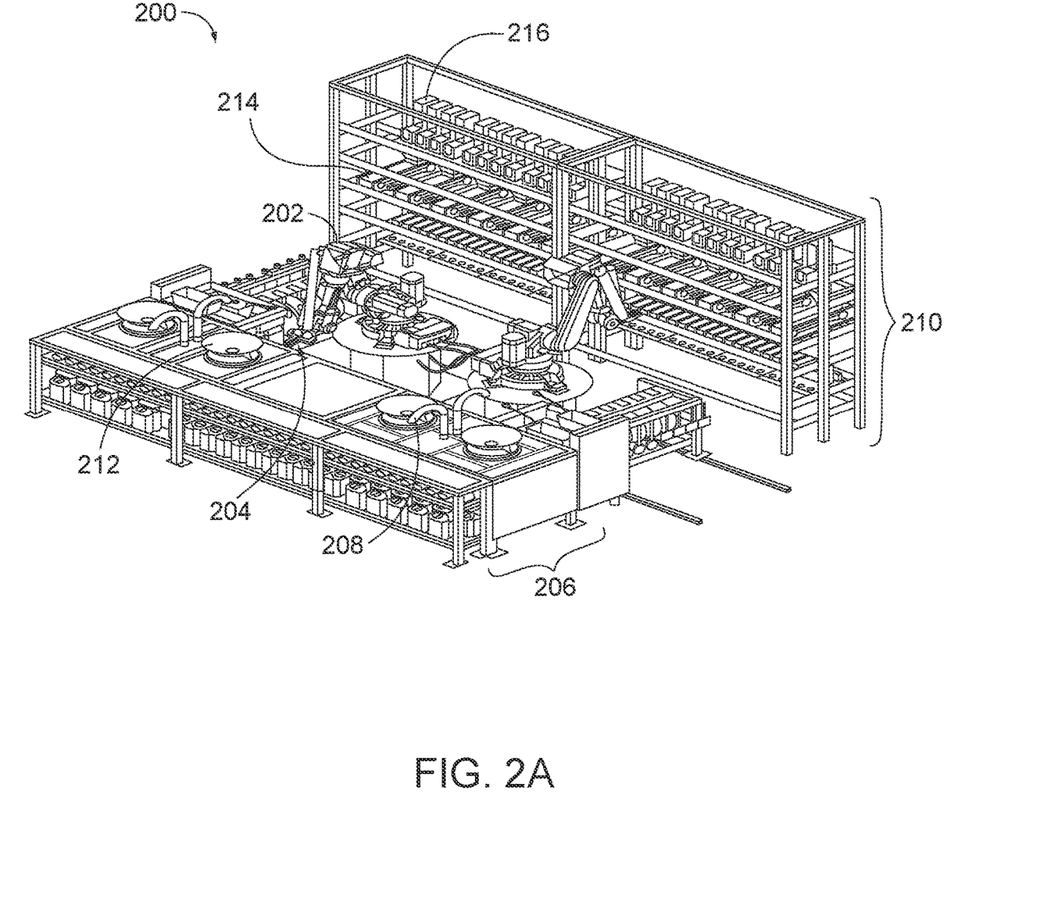
FIG. 2A is an oblique view of an exemplary robot kitchen for a system for automated cooking, according to one aspect.
Figure 2B:
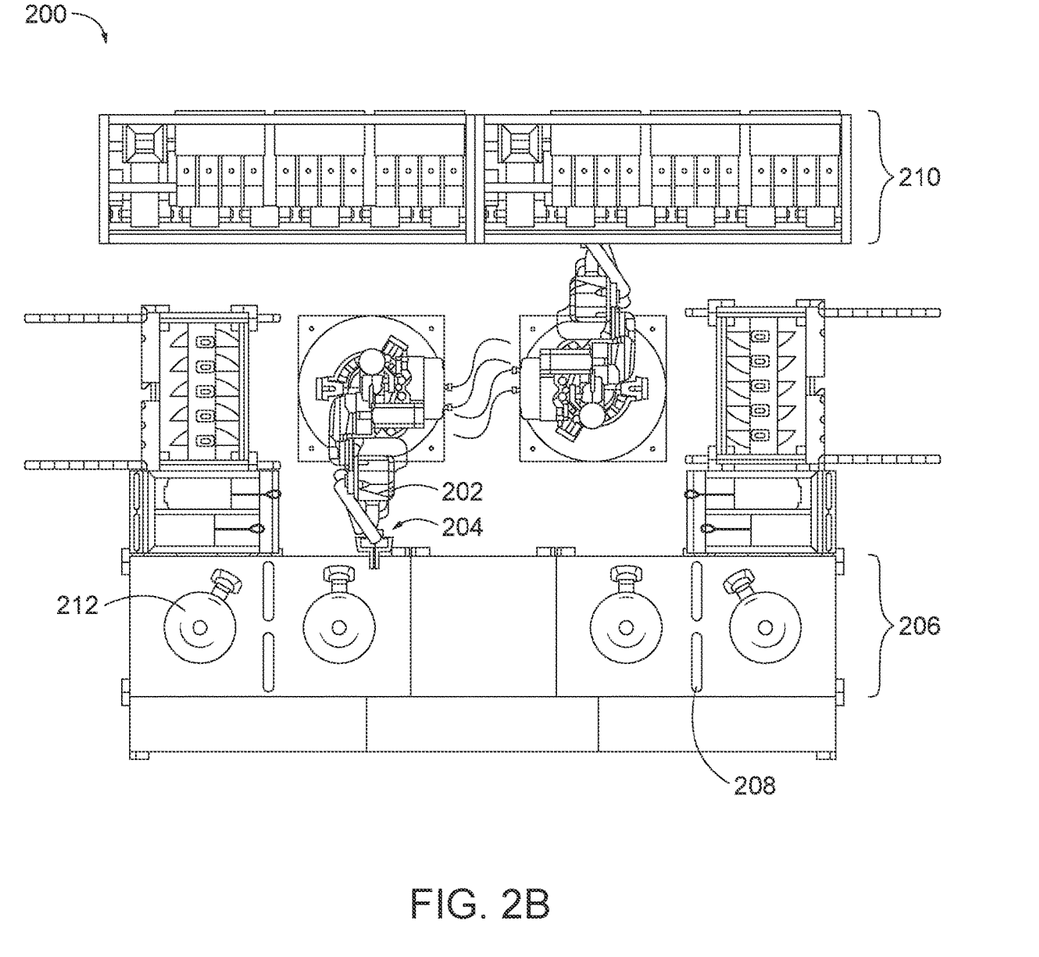
FIG. 2B is a top down view of an exemplary robot kitchen for a system for automated cooking, according to one aspect.

Referring now to the drawings, wherein the showings are for purposes of illustrating one or more exemplary embodiments and not for purposes of limiting same, FIG. 1 is a schematic diagram of an operating environment 100 according to an exemplary embodiment is shown. One or more of the components of the operating environment 100 can be utilized, in whole or in part, with an automated robot kitchen 200, as shown in FIG. 2. The components of the operating environment 100, as well as the components of other systems, hardware architectures, and software architectures discussed herein, may be combined, omitted, or organized into different architectures for various embodiments. The operating environment 100 may be implemented with a device or remotely stored.

The operating environment 100 may include a device station 102 having a computing device 104, a robotic device 106, a remote system 108 that communicates via a network 110. Generally, the computing device 104 includes a device processor 112, a device memory 114, a device data store 116, a position determination unit 118, and a communication interface 120, which are each operably connected for computer communication via a bus 122 and/or other wired and wireless technologies defined herein. The computing device 104, can include provisions for processing, communicating, and interacting with various components of the operating environment 100. In one embodiment, the computing device 104 can be implemented with the robotic device 106, for example, as part of a telematics unit, a head unit, an electronic control unit, an on-board unit, or as part of a specific robotic system, among others. In other embodiments, the computing device 104 can be implemented remotely, for example, with a remote system 108 or a portable device (not shown) connected via the communications network 110.

The processor 112 can include logic circuitry with hardware, firmware, and software architecture frameworks for automated cooking. Thus, in some embodiments, the processor 112 can store application frameworks, kernels, libraries, drivers, application program interfaces, among others, to execute and control hardware and functions discussed herein. For example, the processor 112 can include an identification module 124, a delivery module 126, an execution module 128, and a feedback module 130, although it is understood that the processor 112 can be configured into other architectures. Further, in some embodiments, the device memory 114 and/or the device data store 116 can store similar components as the processor 112 for execution by the processor 112.

The modules of the processor 112 may access the position determination unit 118 via the bus 122. The position determination unit 118 can include hardware (e.g., sensors) and software to determine and/or acquire position data about various components of the operating environment 100, such as the robotic device 106. For example, the position determination unit 118 can include a positioning system (not shown) and/or an inertial measurement unit (IMU) (not shown). Further, the position determination unit 118 can provide dead-reckoning data or motion data from, for example, a gyroscope, accelerometer, magnetometers, among other sensors, such as the robotic sensors 140.

The communication interface 120 can include software and hardware to facilitate data input and output between the components of the computing device 104 and other components of the operating environment 100. Specifically, the communication interface 120 can include network interface controllers (not shown) and other hardware and software that manages and/or monitors connections and controls bi-directional data transfer between the communication interface 120 and other components of the operating environment 100 using, for example, the communication network 110.

The robotic device 106 include a robot processor 132, a robot memory 134, a robot communications system 136, robotic systems 138, and robotic sensors 140. For example, the robotic device 106 may include the robot kitchen 200 in whole or in part, such as robotic arms 202, end effectuators 204, a cooking surface 206, a liquid dispenser 208, and/or a storage unit 210, among others. For example, the a robot processor 132, a robot memory 134, and a robot communications system 136 may be situated in the robotic arms 202 or distributed among multiple components of the robot kitchen 200. The robotic systems 138 can include any type of robotic control system and/or component of the robotic kitchen 200 described herein to enhance the robotic device 106. For example, the robotic systems 138 can include measuring systems, electronic mobility control, electronic stability control, etc. As will be described, one or more of the robotic systems 138 can be controlled remotely according the systems and methods discussed herein.

The robotic sensors 140, which can be implemented with the robotic systems 138, can include various types of sensors for use with the robotic device 106 and/or the robotic systems 138 for detecting and/or sensing a parameter of the associated with automated cooking. For example, the robotic sensors 140 can provide data about ingredients, cooking, recipes, tasks, and/or various components of the operating environment 100. The robotic sensors 140 may include, but are not limited to: acceleration sensors, speed sensors, braking sensors, proximity sensors, and vision sensors, among others. Accordingly, the robotic sensors 140 can be any type of sensor, for example, acoustic, electric, environmental, optical, imaging, light, pressure, force, thermal, temperature, and/or proximity, among others.

The remote system 108 may include a remote processor 142, a remote memory 144, and a remote communication system 146 that are configured to be in communication with one another. In some embodiments, the remote system 108 can receive and transmit information to and from the computing device 104 and/or the robotic device 106 including, but not limited to recipe information, ingredient data, delivery data, task data, feedback data, etc. In some embodiments, the remote system 108 other entities operating in conjunction with the operating environment 100, such a third party recipe aggregators, social media outlets, etc.

Using the system and network configuration discussed above, the robotic devices of the robot kitchen 200 can be controlled to perform automated cooking tasks without human intervention. Detailed embodiments describing exemplary methods using the system and network configuration discussed above will now be discussed in detail.

II. Methods for Automated Cooking

Figure 3:
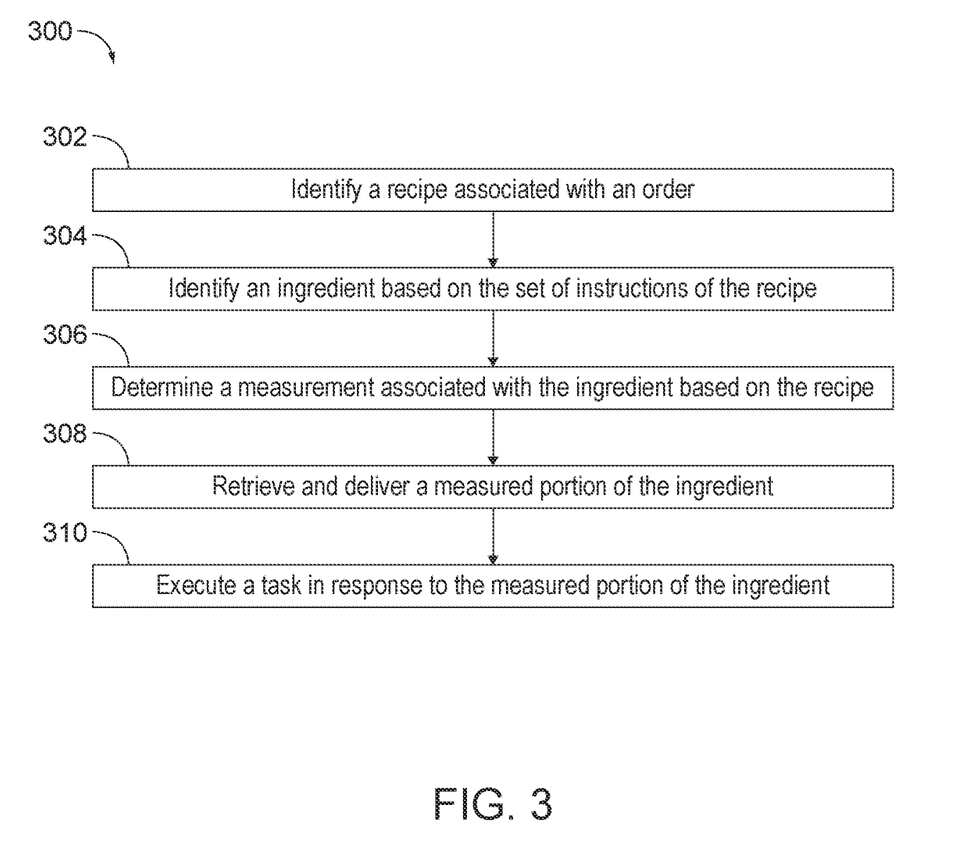
FIG. 3 is an exemplary process flow of a method for automated cooking, according to one aspect.

Referring now to FIG. 3, a method 300 for automated cooking will now be described according to an exemplary embodiment. FIG. 3 will also be described with reference to FIGS. 1, 2, 4, and 5. For simplicity, the method 300 will be described by the following steps, but it is understood that the elements of the method 300 can be organized into different architectures, blocks, stages, and/or processes.

At block 302 the method 300 includes the identification module 124 identifying a recipe associated with an order. The order identifies at least one food item to be prepared, served, and/or delivered by the robot kitchen 200. The order may be received from a user. A user may submit the order remotely from or on-site at the robot kitchen 200. An on-site order may be received at the robot kitchen 200. For example, the robot kitchen 200 may be associated with a restaurant or storefront. In another embodiment, the robot kitchen 200 may be located in a kiosk or vending system. Accordingly, an order may be made at the premises of the robot kitchen 200, for example, via a digital menu.

In some embodiments, the recipe may be stored locally on the computing device 104. For example, the recipes may be stored in the device memory 114 or the device data store 116. Further, the device processor 112 may support an operating platform that incorporates edge computing to execute the locally stored recipes.

A remote order may be received by the robot kitchen 200 regardless of the location of the user. For example, the order may be received from a portable device via a website or application. In some embodiments, the order may include location services data to identify the robot kitchen 200 closest to the user. Suppose the portable device is a smart phone, the user may order via an application. The order process may include selecting a robot kitchen 200, for example, from a drop-down menu, a map, or a list of robot kitchens that include a selected food item on a menu, etc. As another embodiment, the user may be prompted to order based on an order history. For example, suppose the user routinely orders a curry dish from the robot kitchen on Friday evenings. The user may be prompted to order again via the portable device.

The at least one food item may be selected from a plurality of food items. For example, a menu of the plurality of food items may be populated based on the ingredients in stock at the robot kitchen 200. In another embodiment, the at least one food item may be selected by virtue of a combination of food items being selected. Suppose that a meal includes a first combination of food items: hamburger, French fries, and a milk shake. By selecting the first combination, the order includes at least three food items: hamburger, French fries, and a milk shake. The at least one food item may be offered via a social media, media outlet, or locale. For example, a food item may be associated with a social media personality, such as a celebrity. When the user accesses the social media of the social media personality, the user may be prompted to select the at least one food item.

At least one recipe is identified for the order based on the food items included in the order. Continuing the example from above, suppose that the first combination is selected, recipes for the hamburger, French fries, and a milk shake are identified for the order. The recipes may be stored and identified in the device memory 114, the device data store 116, or the remote memory 144. In one embodiment, the recipes may be stored locally or remotely in a recipe database 154. Receiving the order may cause the identification module 124 to query the computing device 104, remote system 108, or recipe database 154 for the one or more recipes associated with the food items included in the order. In one embodiment, the computing device 104 is local to the robotic device 106 and the recipe is received from the remote system 108 via the network 110.

Figure 4:
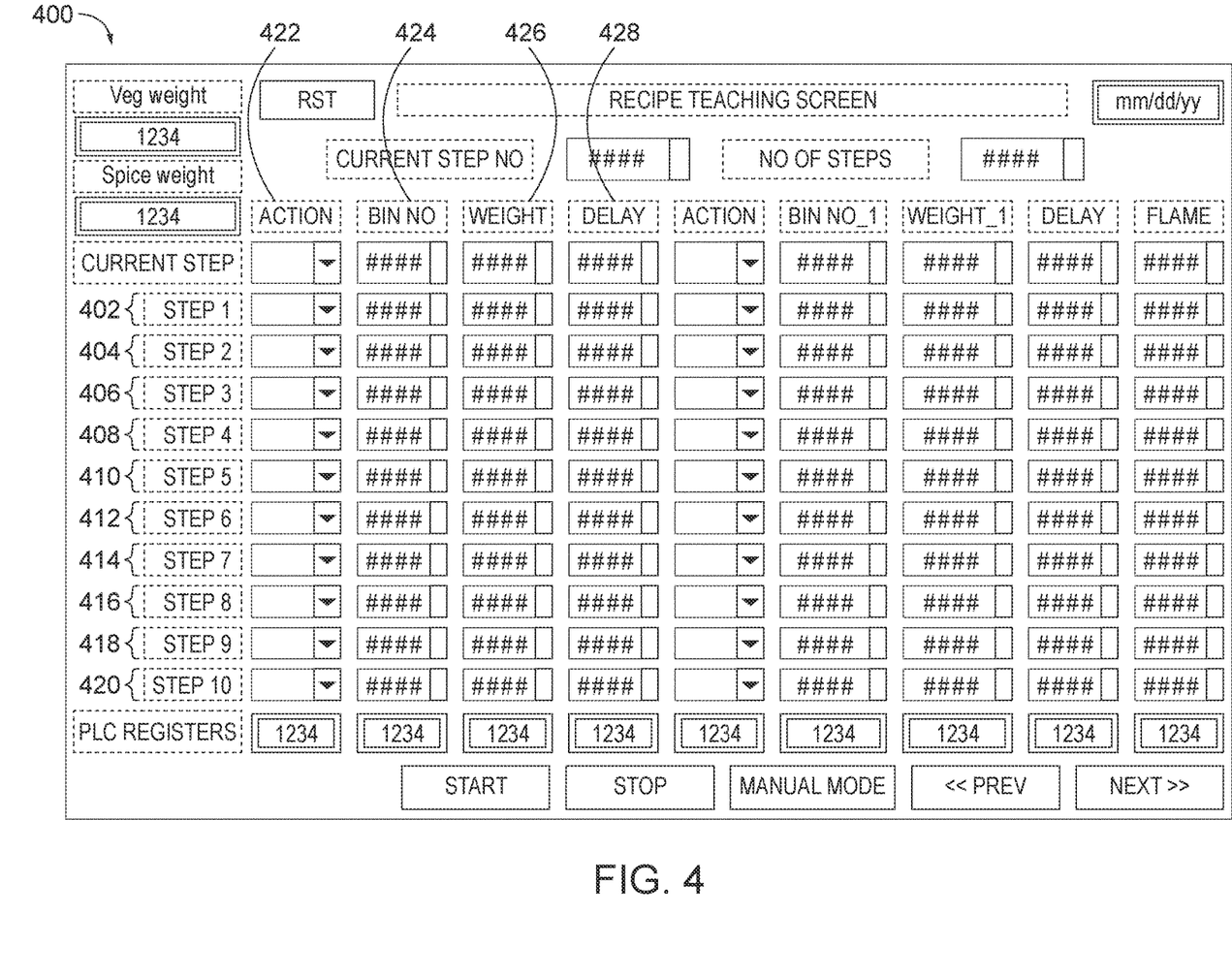
FIG. 4 is an exemplary set of instructions for a recipe for automated cooking, according to one aspect.

The recipe includes a set of instructions for preparing the at least one food item. Turning to FIG. 4, a recipe 400 includes an exemplary set of instructions for a recipe for automated cooking, according to one aspect. The set of instructions includes a number of steps, such as a first step 402, a second step 404, a third step 406, a fourth step 408, a fifth step 410, a sixth step 412, a seventh step 414, an eighth step 416, a ninth step 418, a tenth step 420. The steps may include actions 422. The actions 422 include operations to be taken by the robot kitchen 200 to facilitate preparation of the food item, for example, stove ignition, preheating, flame control, ingredient identification, ingredient collection instructions, utensil selection, and cooking manipulations (e.g., mix, fold, pour, flip, etc.), among others. The steps may further include location of objects such as ingredients, containers, cookware, utensils, etc.

In one embodiment, the set of instructions may also include locations 424. For example, the locations 424 may include identifiers for compartments of the storage unit 210, such as a bin number. The storage unit 210 may be separated into sections based on the type of ingredient (e.g., spice, vegetable, fruit, meat, dairy, frozen, etc.).

Figure 5:
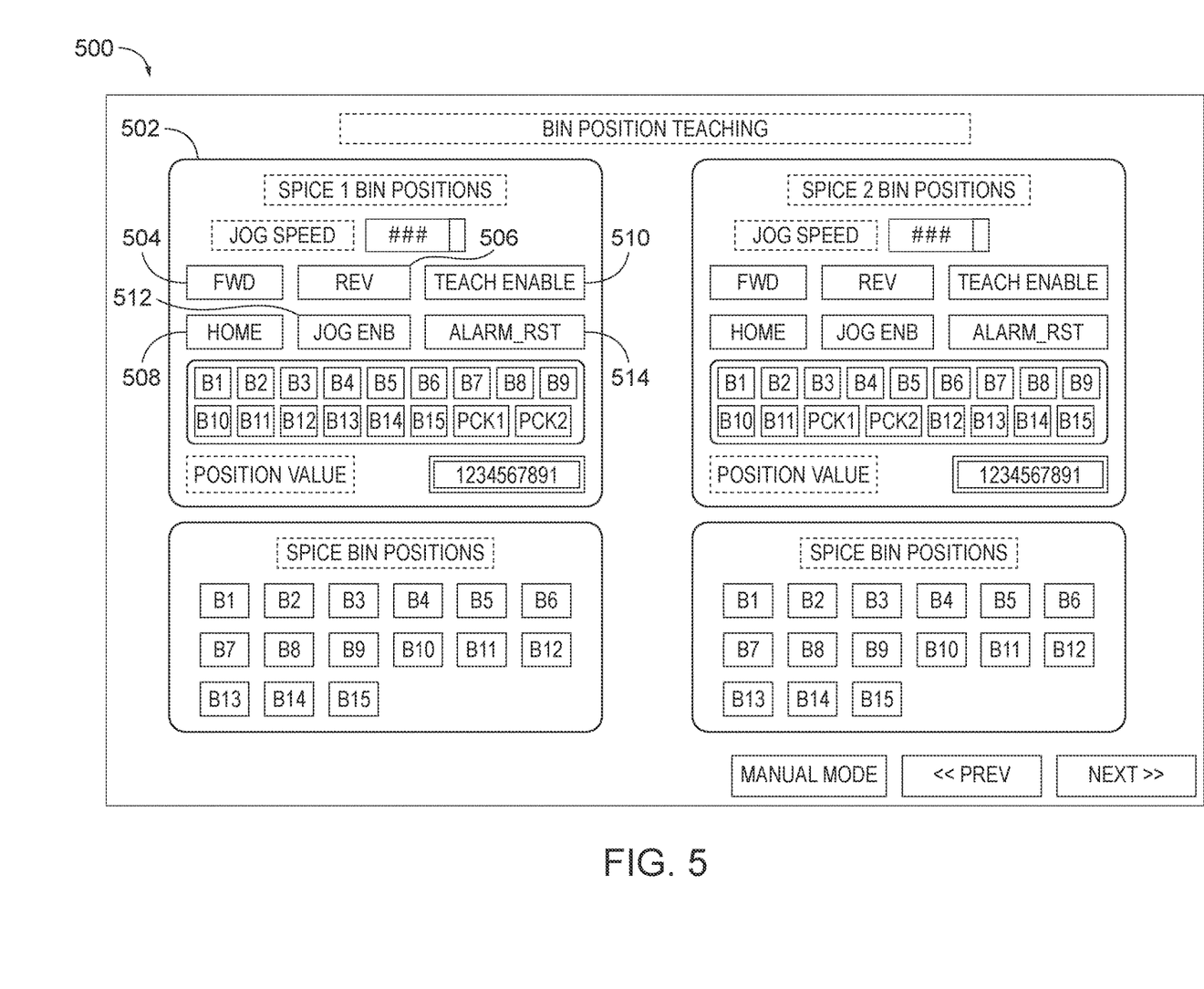
FIG. 5 is an exemplary bin positioning system for automated cooking, according to one aspect.

The robot kitchen 200 may learn the locations 424 of ingredients based on position values of the compartments and relative distance values to other compartments of the storage unit 210. Turning to FIG. 5, an exemplary bin positioning system 500 is shown. As one example, a first spice bin 502 can include directions for the robot arms 202 and the end effectors 204 in terms of forward 504, reverse 506, and a home feature 508. The directions indicate the manner in which the robot arms 202 and end effectuators 204 are to move to achieve the position.

The bin positioning system 500 may also include different modes, such as a teaching mode 510, a jog mode 512, and a reset 514. The modes may indicate the form of the directions. For example, the directions may be based on a home position in the teaching mode 510 such that the home feature 508 is initiated after each instruction is executed. In the jog mode 512, the directions are based on the current position of the robot arms 202 and the end effectuators 204 to allow the robot arms 202 and the end effectuators 204 to move about the robot kitchen 200 without returning to the home position. The reset 514 may cause the robot arms 202 and the end effectuators 204 to return to the home position. Accordingly, the modes may change how the locations 424 are given.

Returning to FIG. 4, the set of instructions may further include weight 426, cooking times 428, and serving instruction, flame temperature, among others. Therefore, the recipe may include details for the food item, such as the ingredients for the food item, a quantity (e.g., number, weight, volume, etc.) of each ingredient, a sequence of operations to be performed by the robot kitchen 200, necessary utensils and/or cookware, and any related activities to prepare the food item. In some embodiments, the steps may include multiple actions and therefore, multiple locations 424, weight 426, cooking times 428, etc.

Because the operations are performed by the robot kitchen 200, the set of instructions are directed to robotic actions that include precise motions, timing data, etc. For example, the robot kitchen 200 may be mapped to a coordinate system. The set of instructions may include precise coordinates or differential coordinates that dictate movements of the robot kitchen 200. Furthermore, the coordinate system may allow the robot kitchen 200 to identify a number of reference points throughout the robot kitchen 200. Additionally or alternatively, the robot kitchen 200 may utilize the robotic system 138 and the robotic sensors 140 to receive environmental data about the robot kitchen. For example, suppose that the robot kitchen 200 has a home position for the robot arms 202. The robotic system 138 may include a servo-mechanism that indicates that despite an instruction to move to the home position, the robotic arms 202 are in an incorrect position. In another embodiment, the robotic sensors may include optical or LiDAR sensors that allow the robot kitchen 200 to determine that the robot arms 202 have not achieved. In this manner, the set of instructions allow the mechanisms of the robot kitchen 200, such as the robotic arms 202 to track the precise location, transport, and/or manipulate the other mechanisms, ingredients, cookware, utensils, etc.

Returning to FIG. 3, at block 304 the method 300 includes the identification module 124 identifying an ingredient based on the set of instructions of the recipe. The ingredients may be identified using the robotic systems 138 and/or the robotic sensors 140. For example, the ingredients may be identified based on a visual recognition system 148 of the robotic systems 138 based on sensor data received from optical sensors 150 of the robotic sensors 140. In another embodiment, the optical sensors 150 may be used to read alpha-numeric identifiers, quick response (QR) codes, bar codes, labels, tags, etc. The robotic sensors 140 may also use radio frequency technology to identify ingredients using radio frequency identification (RFID). Accordingly, the set of instructions of the recipe may link each ingredient to a machine readable identifier that the robot kitchen 200 is able to identify in order to detect an ingredient.

In another embodiment, the identification of an ingredient may include identifying the location of the ingredient in a storage unit 210 of the robot kitchen 200. In particular, the set of instructions of the recipe may link each ingredient to a position in the robot kitchen 200. The ingredients are stored in one or more storage areas, such as the storage unit 210 as shown with respect to FIG. 4. The storage unit 210 is divided into a number of compartments for the ingredients. The compartments are designed to safely store the ingredients. For example, the storage unit 210 may include wet and dry ingredients. The compartments for the wet ingredients may be separated from the compartments of the dry ingredients. Accordingly, the compartments of the storage unit 210 may delineated based on the type of ingredient (e.g., wet ingredient, dry ingredient, meat, vegetable, etc.). The compartments of the storage unit 210 may also be delineated based on the environmental needs of the ingredients. For example, some compartments may be room temperature, refrigerated to preserve ingredients like meat and vegetables, or frozen.

The layout of the storage unit 210 may optimize the space available in the robot kitchen 200. For example, the storage compartments may be stacked in multiple levels. The number of storage compartments may depend on the physical dimension and the capacity of the robot kitchen 200. If the robot kitchen 200 is in a residential space, fewer or smaller compartments may be used, whereas more bins or larger bins may be used if the robot kitchen 200 is in a commercial space. The layout of the storage unit 210 may also be based on ingredient usage. For example, the layout of the robot kitchen 200 may be designed to reduce the time or distance from the compartment of the ingredient to cooking surface 206. The layout of the storage unit 210 may also be designed to allow a plurality of ingredients to be collected in a single run of the robot arms 202.

The location of the ingredient may be provided in the recipe. Alternatively, the ingredient may be identified in the recipe and the identification module 124 may identify the associated location of the ingredient. For example, the locations of the ingredients in the storage unit 210 may be stored in the device memory 114, the device data store 116, or the remote memory 144. The locations may be stored in a database or a look-up table. Suppose that the ingredient, potatoes, is recited in the recipe. The identification module 124 may determine that potatoes are located in a particular compartment of the storage unit, for example, first compartment 214. Alternatively, the recipe may recite a quantity of the ingredient located in first compartment 214 instead of the ingredient itself.

In one embodiment, a feedback module 130 is configured to verify the identity of the ingredient. For example, suppose that the ingredient is identified based on the location. Continuing the example from above, suppose the recipe recites a quantity of the ingredient located in the first compartment 214. The identification module 124 and/or the feedback module 130 may associate the ingredients of first compartment 214 with potatoes. When the first compartment 214 is accessed, the feedback module 130 may compare the ingredient of a first compartment 214 with a visual standard of a potato. For example, the optical sensors 150 may compare sensor data, such as an image of the ingredient located in the first compartment 214 with the visual standard of the potato to verify that the ingredient to be collected is the expected ingredient. In another embodiment, the feedback module 130 may verify the identification of the ingredient before, during, or after collection of the ingredient.

At block 306 the method 300 includes the delivery module 126 determining a measurement associated with the ingredient based on the recipe. For example, the delivery module 126 may determine an amount of the ingredient based on the volume, weight, specific gravity, time to dispense, etc. Some recipes may provide a measurement that can be dispensed as recited by the robot kitchen 200. For example, some recipes may identify pre-programmed measurements of ingredients. Other recipes may require conversion. For example, suppose that the set of instructions included in the recipe, describe a measurement in cups, while the robot kitchen 200 functions in ounces. The robot kitchen 200 may access a conversion chart that allows the robot kitchen 200 to translate recipes from third party sources to a recipe that can be performed by the robot kitchen 200. As one example, the recipe may call for one cup of granulated sugar; the delivery module 126 may cause the end effectuators 204 to collect 7.5 ounces of granulated sugar from the second compartment 216. In this manner, the delivery module 126 may translate the recipe to a measuring method that is actionable by the robot kitchen 200. Accordingly, the delivery module 126 determines whether an ingredient can be dispensed in the manner recited in the recipe according to the set of instructions or whether the amount of the ingredient will be converted to a measurement that is machine actionable by the robot kitchen 200.

The delivery module 126 may also determine a measurement associated with the ingredient based on a type of compartment of the storage unit 210. For example, suppose that the type of the compartment is based on a chute and auger system. The delivery module 126 may determine the measurement as a number of turns of the auger. In another embodiment, the type of compartment may be the liquid dispenser 208 that dispenses a liquid ingredient as an amount of time based on viscosity. For example, suppose that the recipe recites 1 tablespoon of honey. The delivery module 126 may determine that the measurement for 1 tablespoon of honey is activating the liquid dispenser 208 for 1.2 seconds.

At block 308 the method 300 includes the delivery module 126 causing the end effectuators 204 to retrieve a measured portion of the ingredient based on the determined measurement and deliver the measured portion. The measured portion may be delivered to cookware in the robot kitchen 200. In one embodiment, the end effectuators 204 may collect the ingredient. For example, if the ingredient is a potato, the end effectuators 204 may make contact with the potato to retrieve it. Alternatively, if the ingredient is granulated sugar, the end effectuators 204 may receive the ingredient in a container such as a bowl. The container is any object that can receive and hold an ingredient or utensil. Accordingly, the robot kitchen 200 may include any container capable of transporting an ingredient from the storage unit 210 to the cook surface 206.

In some embodiments, the delivery module 126 and/or the robotic device may retrieve and deliver the measured portion of the ingredient based on the position determination unit 118. For example, the robotic device 106 may path plan in the kitchen environment based on dead reckoning data provided by the position determination unit 118. In another embodiment, the robotic device 106 may navigate the kitchen environment based on the robotic systems 138 and/or the robotic sensors 140. Accordingly, the robotic device 106 can determine the precise location of the cookware in the kitchen environment.

At 310 the method 300 includes causing the robotic device 106 of the robot kitchen 200 to execute a task in response to the measured portion of the ingredient being delivered to the cookware. The robotic device 106 may execute the task associated with the recipe by utilizing the robotic systems 138 and/or the robotic sensors 140. In this manner, the execution module 128 causes the robotic device 106 to execute a task in response to the measured portion of the ingredient being delivered to the cookware. The task may include manipulating the ingredient. For example, the task may include stirring, tossing, temperature control, timing control, and receiving visual sensor feedback associated with the measured portion of the ingredient. The task may include preheating a pan to a predetermined temperature to ready the pan for receiving the measured portion of the ingredient. Because the systems and methods are performed with precision that saves people the time that they would otherwise spend on meal preparation while providing consistency in taste, texture, flavor, and visual appeal of the food.

Figure 6:
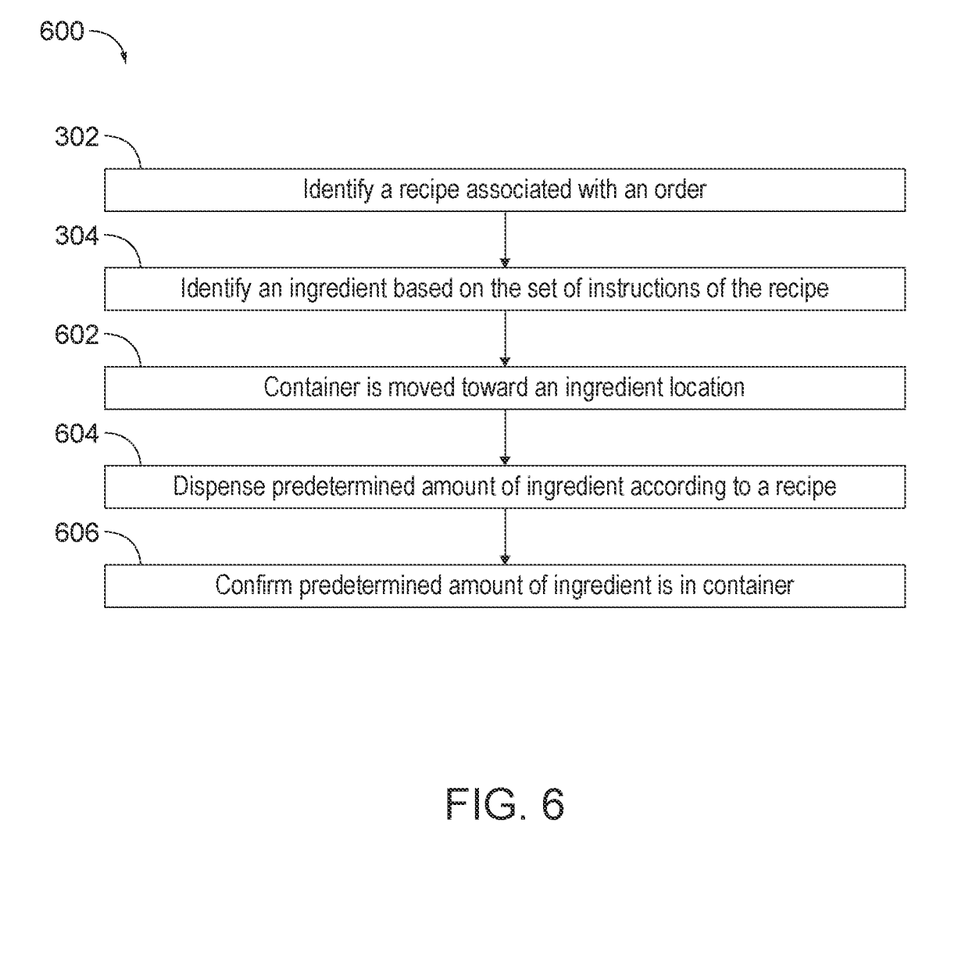
FIG. 6 is an exemplary process flow of a method for automated cooking, according to one aspect.

FIG. 6 is an exemplary process flow of a method 600 for automated cooking, according to one aspect. FIG. 6 will also be described with reference to FIG. 1-5. In particular, some of the steps are similar to steps of the method 300 of FIG. 3 and are performed and/or operate in a similar manner. For simplicity, the method 600 will be described by the following steps, but it is understood that the elements of the method 600 can be organized into different architectures, blocks, stages, and/or processes.

At block 302 the method 600 includes the identification module 124 identifying a recipe associated with an order. At block 304 the method 600 includes the identification module 124 further identifying an ingredient based on the set of instructions of the recipe. At block 602, the method 600 includes the delivery module 126 causes a container to be moved toward an ingredient location. The container may be a vessel used to transport the ingredient from the storage unit 210 to the cook surface 206. The container may be a scoop, cup, bowl, glass, etc.

At block 604, the method 600 includes dispensing the predetermined amount of the ingredient according to a recipe. In some embodiments, the delivery module 126 may track ingredients, containers, compartments of the storage unit 210, cookware, utensils, etc. throughout the robot kitchen 200. An ingredient may not be dispensed until a predetermined container is positioned in a predetermined location to retrieve the ingredient. For example, suppose the container for granulated sugar is a bowl, the granulated sugar may not be dispensed until the bowl is in a predetermined position relative to the second compartment 216, where the granulated sugar is stored. In one embodiment the predetermined position is a range of positions. Accordingly, in order to track the ingredient, the delivery module 126 may track a container for the ingredient. When, the container is tracked to a predetermined position, the delivery module 126 may cause the ingredient to be dispensed. In another embodiment, the robot arms 202 and/or end effectuators 204 may send or receive a positioning signals to or from the delivery module 126 to cause the ingredient to be dispensed. The position and/or positioning signals may be based on object tracking.

The tracking may be performed by the robotic systems 138 and/or the robotic sensors 140. For example, the robotic sensors 140 may collect sensor data from the optical sensors 150 or radio frequency (RF) sensors 152. For example, the robotic sensors 140 may visually track objects (e.g., ingredients, containers, compartments of the storage unit 210, cookware, utensils, etc.) with the optical sensors 150 through imaging of the robot kitchen 200. Additionally or alternatively, the robotic sensors 140 may track objects with RF signals using the RF sensors 152. Continuing the example from above, the bowl for collecting the granulated sugar may have an RFID tag that allows the position of the bowl to be tracked throughout the robot kitchen 200.

At block 606, the method 600 includes confirming the predetermined amount of the ingredient is present in the container. Suppose that the robot kitchen 200 includes a conveyor system that moves the containers, utensils, cookware, etc. around the robot kitchen 200. The delivery module 126 may track objects in the robot kitchen based on projections of where an object will be at a given time. For example, knowing the specifications of the robotic devices 106, for example, the speed of the conveyor belt the delivery module 126 may estimate the future location. In one embodiment, the projected location may be based on coordinate mapping for the robot kitchen 200. The robot kitchen 200 may overlay the robot kitchen such that any point in the robot kitchen 200 can be identified using coordinates in the coordinate map. Furthermore, the feedback module 130 may verify the projected location of the object for the future time, at that future time, using the robot systems 138 and/or the robot sensors 140, such as the optical sensors 150. For example, the optical sensors 150 may receive data that the visual recognition system 148 may use to confirm that the tracked object, such as the ingredient and/or the container, is located at the projected location.

The feedback module 130 may also use data from the robotic sensors 140 such as the optical sensors 150, heat sensors, chemical sensors, etc. to assess an ingredient or food item. For example, the food item may be assessed using machine learning to improve order execution. Thus, the feedback module 130 may include artificial neural networks that act as a framework for machine learning, including deep learning. Suppose that the food item is a chicken cutlet with a sauce. The robotic sensors 140 may determine that by the time the sauce is applied the chicken cutlet has an internal temperature 80 degrees Fahrenheit, which is below a user desired internal temperature of 100 degrees Fahrenheit. The feedback module 130 may therefore incorporate machine learning to alter the recipe such that the sauce is applied when the chicken cutlet is the user desired internal temperature. Accordingly, the steps may be of the recipe may be changed using machine learning to perfect the order execution to perfect the recipes. User desired parameters describe user preferences may be received via the network 110 or stored locally at the computing device 104. The user desired parameters may generalized or specific to a particular user.

Figure 7:
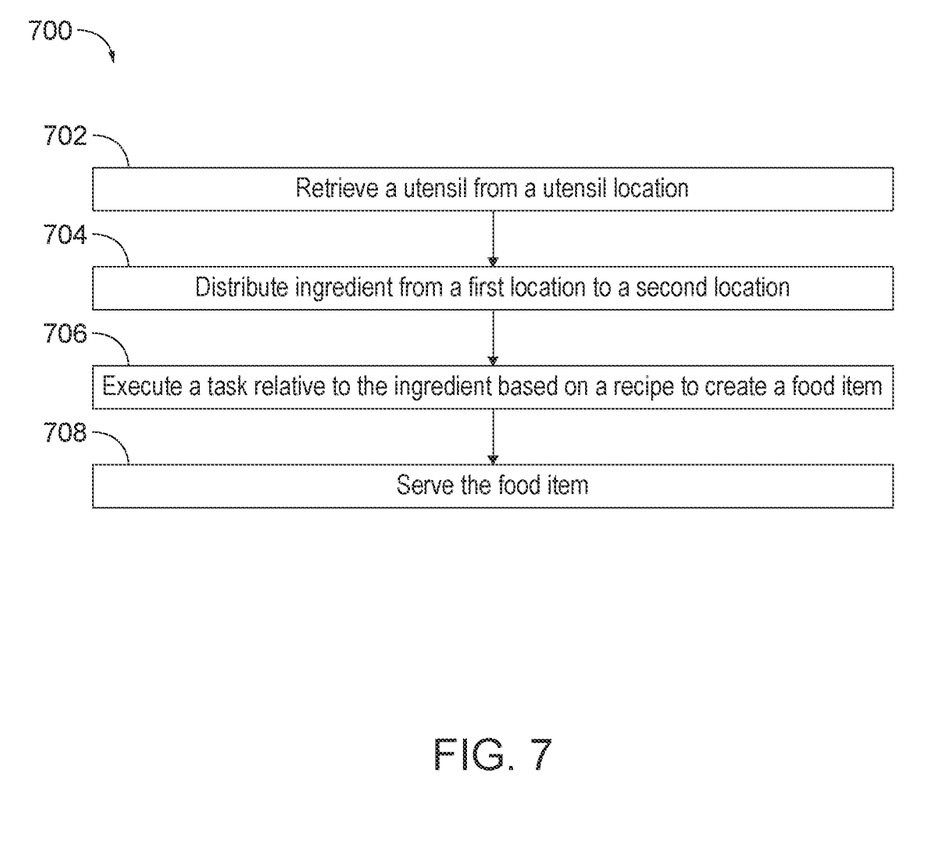
FIG. 7 is another exemplary process flow of a method for automated cooking, according to one aspect.

FIG. 7 is another exemplary process flow of a method for automated cooking, according to one aspect. In particular, in addition to manipulating ingredients, the robot kitchen manipulates utensils. For simplicity, the method 700 will be described by the following steps, but it is understood that the elements of the method 700 can be organized into different architectures, blocks, stages, and/or processes.

At block 702 the method 700 includes retrieving a utensil from a utensil location. In some embodiments, the identification module 124 may identify the utensil based on a resting location of the utensil. In another embodiment, the utensil may be identified based on the tracking techniques described above. For example, the utensil may include an RFID tag that is tracked throughout the robot kitchen and identified using a coordinate map.

At block 704 he method 700 includes distributing an ingredient from a first location to a second location. Suppose that robot kitchen 200 is preparing scrambled eggs and the utensil is a spatula. The ingredient may be beaten eggs that are located in the cookware 212 on heated cook surface 206. The ingredient may be distributed from a first location in the cookware 212 to a second location in the cookware 212 by manipulating the spatula. In this manner the ingredient may be distributed from a first location in the robot kitchen 200 to a second location using the utensil. In another embodiment the ingredient may be dispensed from the liquid dispenser 208 into the cookware 212, thereby distributing the ingredient.

At block 706 the method 700 includes executing a task relative to the ingredient based on a recipe to create the food item. Continuing the example from above, the task may include stirring the beaten eggs in the cookware 212 for a predetermined amount of time until a desired consistency is reached. The consistency may be a desired parameter of the food item. In one embodiment, a parameter associated with the task is measured. For example, if the parameter is consistency, the robot systems 138 may measure the parameter based on sensor data, such as the force required to stir the cooking eggs. As another example, the parameter may be measured based on sensor data from the optical sensors 150.

If the parameter is not satisfied the task may be modified based on the measured parameter. Continuing the example from above, suppose the task was to stir the beaten eggs in the cookware 212 for a predetermined amount of time until a desired consistency is reached. If the parameter is not satisfied when the predetermined amount of time elapses, the task may be modified to extend the predetermined amount of time in increments. In this manner, the tasks may be modified in real-time based without user invention to maintain providing consistency in taste, texture, flavor, and visual appeal of the food.

At block 708 the method 700 includes serving the food item. The food item may be served to the user on a plate or in a container. The food item may be delivered directly o the user on-site. For example, the food item may be delivered to the user using a conveyor. The food item may also be delivered to the user who is located remotely from the robot kitchen 200. Thus the order can be completed from order to delivery without human intervention.

Figure 8:
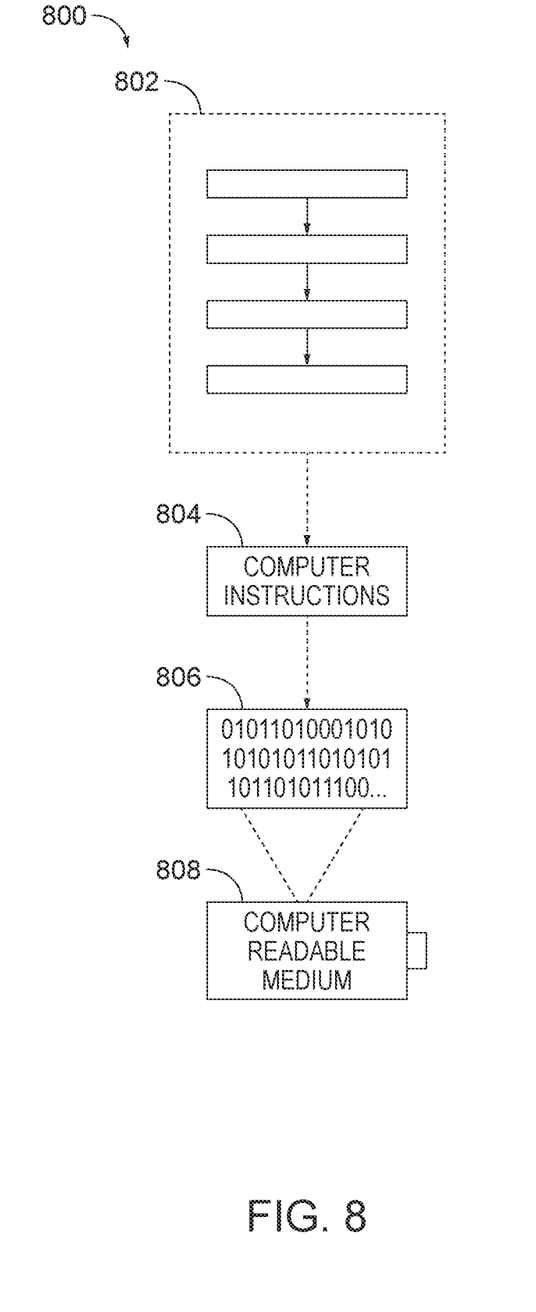
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, etc., on which is encoded computer-readable data 806. This encoded computer-readable data 806, such as binary data including a plurality of zero's and one's as shown in 806, in turn includes a set of processor-executable computer instructions 804 configured to operate according to one or more of the principles set forth herein. In this implementation 800, the processor-executable computer instructions 804 may be configured to perform a method 802, such as the method 300 of FIG. 3, the method 600 of FIG. 6, and the method 700 of FIG. 7. In another aspect, the processor-executable computer instructions 804 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory computer readable storage medium storing instructions that when executed by a computer having a processor to perform a method for preparing food items in a robot kitchen, the method comprising:
  identifying a recipe associated with an order for at least one food item, wherein the recipe includes a set of instructions for preparing the at least one food item;
  identifying an ingredient and an associated ingredient compartment based on the set of instructions of the recipe;
  estimating a predetermined location of the associated ingredient compartment for a future time based on projections of where an object will be at a given time, using the at least one robot sensor;
  determining a measurement associated with the ingredient based on the set of instructions of the recipe, and based on a type of compartment of the associated ingredient compartment;
  tracking a container to contain the measured ingredient to a predetermined position relative to the associated ingredient compartment of the ingredient based on sensor data from at least one robot sensor and a coordinate map of the robot kitchen;
  confirming the container is positioned in the predetermined location relative to the associated ingredient compartment of the ingredient;
  dispensing the measurement of the ingredient into the container in response to the confirmation;
  confirming that the measurement of the ingredient is present in the container based on sensor data from the at least one robot sensor, wherein the at least one robot sensor detects an amount of the ingredient in the container;
  assess a quality of the ingredient in the container based on the sensor data generated by detecting the ingredient in the container with the at least one robot sensor;
  causing a robotic device to retrieve a measured portion of the ingredient in the container based on the measurement and the quality of the ingredient in the container, and deliver the measured portion of the ingredient to cookware in the robot kitchen; and causing the robotic device to execute a task in response to the measured portion of the ingredient being delivered to the cookware.

2. The non-transitory computer readable storage medium of claim 1, wherein identifying the ingredient includes identifying a location of the ingredient in the associated ingredient compartment.

3. The non-transitory computer readable storage medium of claim 1, further comprising verifying an identity of the ingredient and assessing the ingredient based on sensor data from the at least one robot sensor.

4. The non-transitory computer readable storage medium of claim 1, further comprising:

measuring a parameter associated with the task and modifying the task based on the measured parameter.

5. The non-transitory computer readable storage medium of claim 1, wherein the at least one robot sensor includes a radio frequency (RF) sensor, and wherein the sensor data includes at least one RF signal.

\* \* \* \* \*